United States Patent
Shah et al.

(10) Patent No.: US 10,067,758 B1
(45) Date of Patent: Sep. 4, 2018

(54) SYSTEMS AND METHODS FOR IMPROVED WORKFLOW PROCESSING

(71) Applicant: JPMorgan Chase Bank, N.A., New York, NY (US)

(72) Inventors: Shyamal J. Shah, Wesley Chapel, FL (US); Kevin T. Hanrahan, Evanston, IL (US); David John Walsh, Winnetka, IL (US); Zak Burkhardt, Riverview, FL (US); Jeremy Rojas, Miami Shores, FL (US); Renato Marciano, Jr., Brandon, FL (US); Leila Elorfi, Wesley Chapel, FL (US); Lance Calamita, Chicago, IL (US); Anil Kumar Chunduru, Mumbai (IN)

(73) Assignee: JPMorgan Chase Bank, N.A., New York, NY (US)

( * ) Notice: Subject to any disclaimer, the term of this patent is extended or adjusted under 35 U.S.C. 154(b) by 85 days.

(21) Appl. No.: 15/188,438

(22) Filed: Jun. 21, 2016

(51) Int. Cl.
  G06F 9/44 (2018.01)
  G06F 8/70 (2018.01)
  G06F 8/30 (2018.01)

(52) U.S. Cl.
  CPC .............. G06F 8/70 (2013.01); G06F 8/315 (2013.01)

(58) Field of Classification Search
  CPC ........................... G06F 8/10–8/33; G06F 8/70
  USPC .................................................. 717/118, 120
  See application file for complete search history.

(56) References Cited

U.S. PATENT DOCUMENTS

| | | | | |
|---|---|---|---|---|
| 6,574,617 B1 * | 6/2003 | Immerman | ............ | G06Q 10/10 |
| 6,862,488 B2 * | 3/2005 | Mansour-Awad | ..... | G06Q 10/06 700/103 |
| 7,383,529 B2 * | 6/2008 | Gupta | ................. | G06F 17/5045 716/104 |
| 7,685,582 B2 * | 3/2010 | Haselden | ................ | G06F 8/315 717/150 |
| 7,752,599 B2 * | 7/2010 | Takacsi-Nagy | ........... | G06F 8/31 717/114 |

(Continued)

OTHER PUBLICATIONS

Verification of Change in a Fragmented Event-Based Process Coordination Environment; Pieter Hens, Monique Snoeck, Manu De Backer and Geert Poels—IEEE Transactions on Services Computing ( vol. 7, Issue: 3—pp. 501-514, Jul.-Sep. 2014 ).*

(Continued)

*Primary Examiner* — Francisco Aponte

(74) *Attorney, Agent, or Firm* — Hunton Andrews Kurth LLP

(57) ABSTRACT

Systems and methods for improved workflow processing are disclosed. In one embodiment, a method for workflow processing may include (1) a workflow manager executed by a computer processor traversing at least a portion of a computer code to identify a plurality of units of work therein, each unit of work having a dimension; (2) the workflow manager creating a grouping for each dimension; (3) the workflow manager associating each of the plurality of units of work with a grouping based on the unit of work's dimension; (4) the workflow manager receiving a message for processing; (5) the workflow manager identifying a message dimension for the message; (6) the workflow manager identifying one of the plurality of groupings that has the same dimension as the message dimension; and (7) the workflow manager invoking the units of work in the identified grouping.

18 Claims, 2 Drawing Sheets

(56) References Cited

U.S. PATENT DOCUMENTS

| | | | | |
|---|---|---|---|---|
| 8,042,092 B2* | 10/2011 | Koehler | ............... | G06F 8/10 |
| | | | | 717/105 |
| 8,381,181 B2* | 2/2013 | Davis | ............... | G06F 8/10 |
| | | | | 717/120 |
| 8,407,712 B2* | 3/2013 | Davis | ............... | G06F 9/54 |
| | | | | 718/106 |
| 8,443,351 B2* | 5/2013 | Haselden | ............... | G06Q 10/10 |
| | | | | 717/149 |
| 8,473,893 B2* | 6/2013 | Poole | ............... | G06F 8/75 |
| | | | | 709/203 |
| 8,660,976 B2* | 2/2014 | Vasquez Lopez | ...... | G06F 17/24 |
| | | | | 706/48 |
| 9,696,971 B1* | 7/2017 | Wierda | ............... | G06F 8/36 |
| 9,740,538 B1* | 8/2017 | Cohen | ............... | G06F 9/54 |
| 2003/0023957 A1* | 1/2003 | Bau, III | ............... | G06F 8/20 |
| | | | | 717/140 |
| 2004/0098154 A1* | 5/2004 | McCarthy | ............... | G06F 17/50 |
| | | | | 700/97 |
| 2004/0260715 A1* | 12/2004 | Mongeon | ............ | G06F 17/30908 |
| 2005/0022164 A1* | 1/2005 | Takacsi-Nagy | ............ | G06F 8/31 |
| | | | | 717/117 |
| 2006/0048093 A1* | 3/2006 | Jain | ............... | G06F 8/20 |
| | | | | 717/104 |
| 2007/0067373 A1* | 3/2007 | Higgins | ............... | G06F 11/3013 |
| 2007/0240099 A1* | 10/2007 | Jahn | ............... | G06Q 10/06 |
| | | | | 717/104 |
| 2011/0078426 A1* | 3/2011 | Stoitsev | ............... | G06F 8/10 |
| | | | | 712/244 |
| 2012/0053974 A1* | 3/2012 | Kulkarni | ............... | G06Q 10/06 |
| | | | | 705/7.12 |
| 2014/0181817 A1* | 6/2014 | Muller | ............... | G06F 9/45533 |
| | | | | 718/1 |
| 2014/0222522 A1* | 8/2014 | Chait | ............... | G06Q 10/0637 |
| | | | | 705/7.36 |
| 2014/0331278 A1* | 11/2014 | Tkachev | ............... | H04L 63/08 |
| | | | | 726/1 |

OTHER PUBLICATIONS

Web Services Recovery Mechanisms-Business Transactions; Rui Filipe Vital Guerreiro da Costa—Universidade Nova de Lisboa, Faculdade de Ciências e Tecnologia, Departamento de Informática; Feb. 22, 2010.*

* cited by examiner

SYSTEMS AND METHODS FOR IMPROVED WORKFLOW PROCESSING

BACKGROUND OF THE INVENTION

1. Field of the Invention

The present invention generally relates to computer architecture, and, more specifically, to systems and methods for improved workflow processing are disclosed.

2. Description of the Related Art

When a message is received for processing, there is typically logic that directs the way that the message is processed. For example, the message may be validated, enriched, routed, etc. Typically, the code that applies this logic is written as a series of conditional statements, such as "if . . . then" statements.

SUMMARY OF THE INVENTION

Systems and methods for improved workflow processing are disclosed. In one embodiment, a method for workflow processing may include (1) a workflow manager executed by a computer processor traversing at least a portion of a computer code to identify a plurality of units of work therein, each unit of work having a dimension; (2) the workflow manager creating a grouping for each dimension; (3) the workflow manager associating each of the plurality of units of work with a grouping based on the unit of work's dimension; (4) the workflow manager receiving a message for processing; (5) the workflow manager identifying a message dimension for the message; (6) the workflow manager identifying one of the plurality of groupings that has the same dimension as the message dimension; and (7) the workflow manager invoking the units of work in the identified grouping.

In one embodiment, each of the units of work may be a Java class.

In one embodiment, each dimension may include an annotation for the Java class.

In one embodiment, each unit of work may be associated with a plurality of dimensions, and each grouping may have the same plurality of dimensions.

In one embodiment, the dimension for the unit of work may be a requirement to invoke the unit of work.

In one embodiment, the unit of work may include an action to invoke.

In one embodiment, all units of work in a grouping have the same dimension.

In one embodiment, the method may further include the workflow manager determining an order in which a plurality of units of work are invoked within a grouping.

In one embodiment, the order may be based on dependencies among the plurality of units of work within the grouping, may be included in the dimension, etc.

Systems for workflow processing are disclosed. In one embodiment, a system for workflow processing may include at least one message source; and a computer server comprising at least one computer processor and a memory, the computer server in communication with the at least one message source via at least one network. The computer server may execute a workflow manager program that: traverses at least a portion of a computer code to identify a plurality of units of work therein, each unit of work having a dimension; creates a grouping for each dimension; associates each of the plurality of units of work with a grouping based on the unit of work's dimension; receives a message for processing; identifies a message dimension for the message; identifies one of the plurality of groupings that has the same dimension as the message dimension; and invokes the units of work in the identified grouping.

In one embodiment, each of the units of work may be a Java class.

In one embodiment, each dimension may include an annotation for the Java class.

In one embodiment, each unit of work may be associated with a plurality of dimensions, and each grouping may have the same plurality of dimensions.

In one embodiment, the dimension for the unit of work is a requirement to invoke the unit of work.

In one embodiment, the unit of work may include an action to invoke.

In one embodiment, all units of work in a grouping may have the same dimension.

In one embodiment, the workflow manager program may determine an order in which a plurality of units of work are invoked within a grouping.

In one embodiment, the order may be based on dependencies among the plurality of units of work within the grouping, may be included in the dimension, etc.

Embodiments disclosed herein may (1) provide predictable path computation based on dimensions that eliminates need for conditional checks at run time; (2) support modular-based coding which improves maintainability by removing complex "if" conditions; (3) apply a set of operations each with modular actions that can be easily added or removed; (4) provide improved quality, code readability and testability by enforcing a clean and concise coding contract; and (5) facilitate the ability to query the code base to determine the code path a use case will take.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
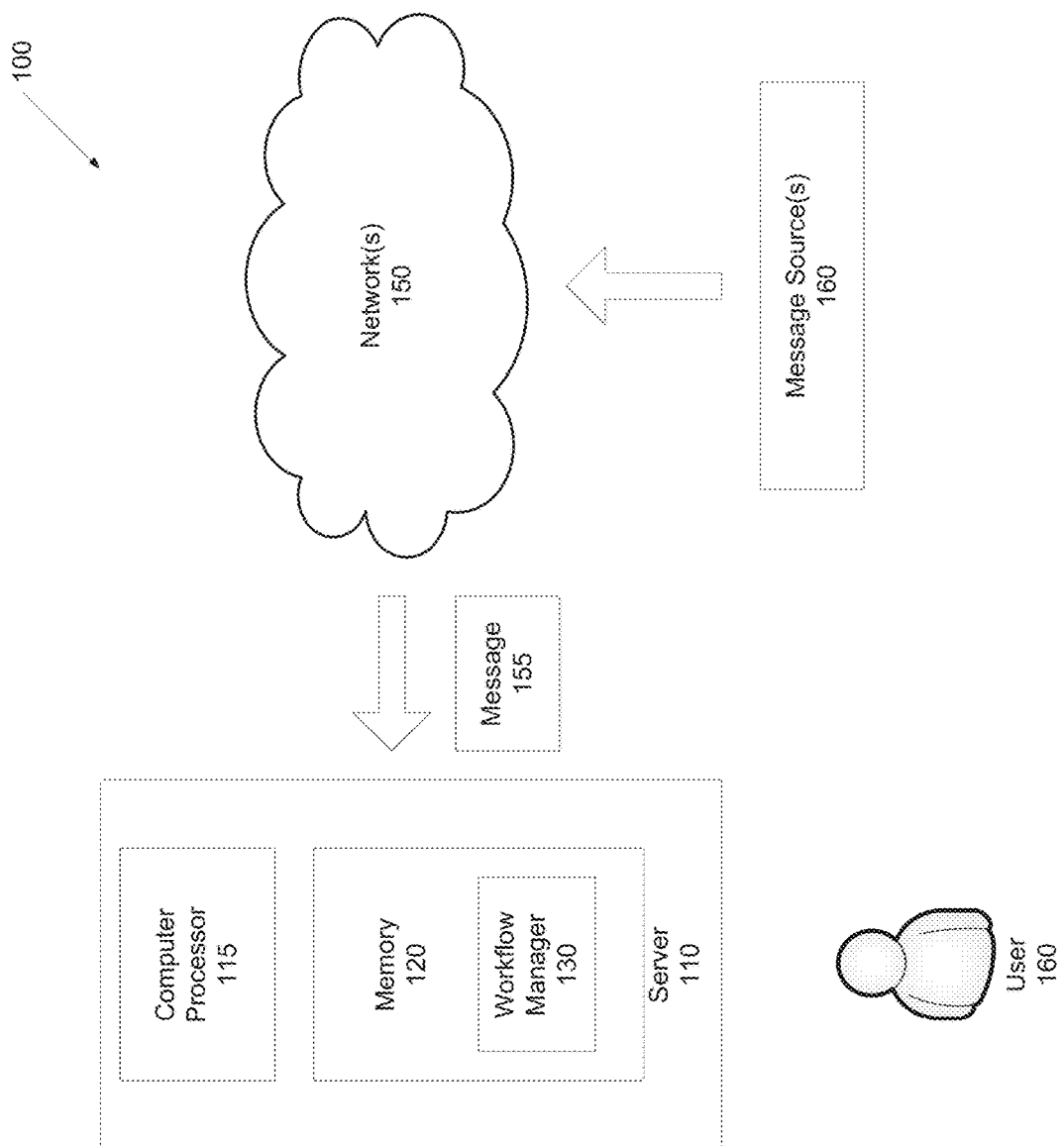
FIG. 1 depicts a system for improved workflow processing according to one embodiment.
Figure 2:
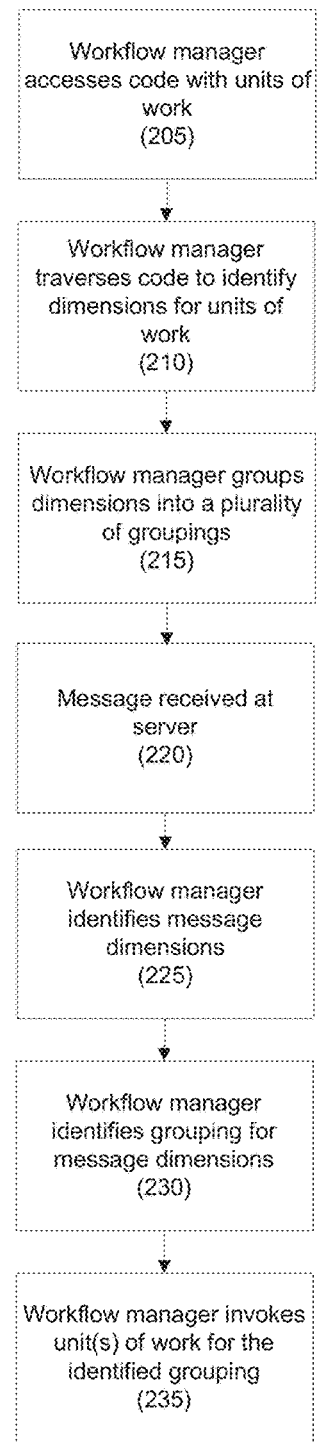
FIG. 2 depicts a method for improved workflow processing according to one embodiment.

Several embodiments of the present invention and their advantages may be understood by referring to FIGS. 1-2.

Conditional code, such as that described above, poses difficulties as additional conditional statements are added. Over time, it is easy for a code writer to add new conditions, making the code difficult to read, to test, and to understand all of the conditions, and the potential paths in the code.

Embodiments disclosed herein are directed systems and methods for improved workflow processing. It should be noted that although this disclosure may be in the context of processing transaction-related messages, the disclosure is not so limited. Indeed, it should be appreciated that the embodiments disclosed herein have broad applicability to manage the workflow associated with processing messages of any type. The workflow manager may invoke any suitable action or response, may interface with any suitable system, etc., as is necessary and/or desired.

In embodiments, a workflow framework that eliminates, or reduces the number of, "if" conditions from logic is disclosed. Instead, embodiments include units of work that would traditionally go inside the "if" conditions. For example, in a transactional environment, units of work may include an individual validation, an individual enrichment step, an individual routing step, etc. Other actions taken by a unit of work may be used as is necessary and/or desired.

Each unit of work may be associated with one or more dimensions. The dimensions may represent qualification(s) for the unit of work to be executed. Example dimensions include a message source, a message destination, a product, etc. The number and type of dimensions may vary depending on the purpose of the code.

In one embodiment, each unit of work may be annotated with the dimension(s).

In embodiments, the code is more maintainable, easier to read, and easier to test than traditional code because it does not involve complex "if" conditions. The code is also easy to modify as units of work may be added and deleted as necessary and/or desired. For example, rather than add conditional "if" statements, all may be needed is a new code annotation and/or a new unit of work.

Referring to FIG. 1, a system for improved workflow processing is disclosed according to one embodiment. System 100 may include server 110, which may comprise one or more computer processors 115. Server 110 may further comprise memory 120.

Computer processor 115 may execute workflow processing manager 130 that may reside in memory 120. User 160 may program workflow processing manager via any suitable interface, remote device, etc.

Server 110 may interface with one or more network 150, and may receive a plurality of messages 155 from, for example, one or more message source 160. Messages 155 may include any type of message, including, for example, transactions. Other message types may include alerts, notifications, batches, queries, data requests, or any custom message type. Any other suitable type of message may be processed as is necessary and/or desired.

In one embodiment, workflow manager 130 may include one or more computer program, computer application, etc. that may be executed to determine what action(s) to take when a message is received. For example, workflow manager 130 may include, or may access, computer code that includes a plurality of units of work. Each unit of work may have one or more dimension that specifies the requirements for that unit of work to be invoked.

In one embodiment, each unit of work may be a Java class, and the dimensions may be annotations for that Java class.

Referring to FIG. 2, a method for improved workflow processing is disclosed according to one embodiment. In step 205, the workflow manager, which may be executed by server, may access workflow code. The workflow code may include a plurality of units of work, as described above.

In step 210, the workflow manager may traverse the workflow code. In one embodiment, the workflow manager may identify the dimensions and that are associated with each unit of work.

In step 215, the units of work may be grouped together into a plurality of groupings based on their dimensions. For example, each combination of dimensions may have its own grouping, and may include all units of work that have that combination of dimensions. The number of groupings may vary depending on the complexity of the workflow code.

In one embodiment, if the order that the units of work are invoked is relevant, the grouping may specify the order of invocation. For example, the workflow manager may identify any dependencies in the units of work, and from the dependencies, may identify the order in which the units of work are to be invoked. In another embodiment, the order of invocation may be based on the order in which the units of work appear in the code. In another embodiment, the unit of work may be annotated with an order, such as first, last, an integer representing its order, etc. Any other manner of identifying the order of invocation may be used as is necessary and/or desired.

If order of invocation is not important, the units of work may be invoked based on the order in which the units of work appear in the code, or by any other suitable manner.

In step 220, an incoming message may be received at the server. In one embodiment, the incoming message may be received from an external network, and internal network, or any other source as is necessary and/or desired.

In step 225, the message dimensions for the message may be identified. In one embodiment, the message dimensions that are identified may be based on the types of dimensions that were identified during code traversal, that may be specified in the code, etc.

In step 230, the workflow manager may identify a grouping that matches the message dimensions.

In step 235, the workflow manager may invoke the unit(s) of work that are in the grouping. In one embodiment, if more than one unit of work is in the grouping, the units of work may be invoked in the order that may be identified by the workflow manger, in the order that they appear in the code, etc.

For example, in a transactional environment, actions may include validation, enrichment, routing, transformation, database interactions, journaling, audit and error handling, etc. Any other suitable action may be performed as is necessary and/or desired.

The next message may be processed in a similar manner as is necessary and/or desired.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for workflow processing, comprising:
   in an information processing apparatus comprising a computer processor, a workflow computer program executed by the computer processor computing a predictable path for computer code by performing the following:
      traversing at least a portion of the computer code to identify a plurality of conditional units of work therein, each conditional unit of work having a dimension that specifies a condition for the unit of work to be invoked;
      creating a grouping for each dimension;
      associating each of the plurality of units of work with a grouping based on the unit of work's dimension;
      receiving a message for processing using the computer code;
      prior to processing the message using the computer code, identifying a message dimension for the message, the identification of the message dimension eliminating conditional checks during processing;
      identifying one of the plurality of groupings that has the same dimension as the message dimension; and
      processing the message by invoking the units of work in the identified grouping.

2. The method of claim 1, wherein each of the units of work is a Java class.

3. The method of claim 2, wherein each dimension comprises an annotation for the Java class.

4. The method of claim 1, wherein each unit of work is associated with a plurality of dimensions, and each grouping has the same plurality of dimensions.

5. The method of claim 1, wherein the unit of work comprises an action to invoke.

6. The method of claim 1, wherein all units of work in a grouping have the same dimension.

7. The method of claim 1, further comprising:
   determining an order in which a plurality of units of work are invoked within a grouping.

8. The method of claim 7, wherein the order is based on dependencies among the plurality of units of work within the grouping.

9. The method of claim 7, wherein the order is included as one of the dimensions for the unit of work.

10. A system for workflow processing, comprising:
    at least one message source; and
    a computer server comprising at least one computer processor and a memory, the computer server in communication with the at least one message source via at least one network;
    wherein the computer server executes a workflow manager program that computes a predictable path for computer code by performing the steps of:
       traverse at least a portion of the computer code to identify a plurality of units of work therein, each unit of work having a conditional dimension that specifies a requirement for the unit of work to be invoked;
       create a grouping for each dimension;
       associate each of the plurality of units of work with a grouping based on the unit of work's dimension;
       receive a message for processing using the computer code;
       prior to processing the message using the computer code, identify a message dimension for the message, the identification of the message dimension eliminating conditional checks during processing;

identify one of the plurality of groupings that has the same dimension as the message dimension; and process the message by invoking the units of work in the identified grouping.

11. The system of claim 10, wherein each of the units of work is a Java class.

12. The system of claim 11, wherein each dimension comprises an annotation for the Java class.

13. The system of claim 10, wherein each unit of work is associated with a plurality of dimensions, and each grouping has the same plurality of dimensions.

14. The system of claim 10, wherein the unit of work comprises an action to invoke.

15. The system of claim 10, wherein all units of work in a grouping have the same dimension.

16. The system of claim 10, wherein the workflow manager program further determines an order in which a plurality of units of work are invoked within a grouping.

17. The system of claim 16, wherein the order is based on dependencies among the plurality of units of work within the grouping.

18. The system of claim 16, wherein the order is included as one of the dimensions for the unit of work.

\* \* \* \* \*